(12) United States Patent
Kay et al.

(10) Patent No.: US 11,203,046 B2
(45) Date of Patent: Dec. 21, 2021

(54) CLEANING AND SANITIZING APPARATUS FOR HANDHELD DEVICES

(71) Applicants: Benjamin Kay, Las Vegas, NV (US); Zachariah Gambino, Las Vegas, NV (US); Hermelindo Ramirez, Las Vegas, NV (US); Victor Siemens, Ft. Wayne, IN (US)

(72) Inventors: Benjamin Kay, Las Vegas, NV (US); Zachariah Gambino, Las Vegas, NV (US); Hermelindo Ramirez, Las Vegas, NV (US); Victor Siemens, Ft. Wayne, IN (US)

(*) Notice: Subject to any disclaimer, the term of this patent is extended or adjusted under 35 U.S.C. 154(b) by 19 days.

(21) Appl. No.: 16/711,171

(22) Filed: Dec. 11, 2019

(65) Prior Publication Data
US 2020/0114398 A1    Apr. 16, 2020

Related U.S. Application Data

(63) Continuation-in-part of application No. 16/002,481, filed on Jun. 7, 2018, now abandoned.

(51) Int. Cl.
| | | |
|---|---|---|
| B08B 7/00 | (2006.01) | |
| B08B 3/02 | (2006.01) | |
| B08B 1/04 | (2006.01) | |
| A45C 11/00 | (2006.01) | |
| H02J 7/00 | (2006.01) | |

(52) U.S. Cl.
CPC ............... *B08B 1/04* (2013.01); *A45C 11/00* (2013.01); *B08B 3/022* (2013.01); *B08B 7/0057* (2013.01); *H02J 7/0044* (2013.01); *A45C 2011/002* (2013.01)

(58) Field of Classification Search
CPC .......... A61L 2/10; A61L 2/24; A61L 2202/16; A61L 2202/122; A61L 2202/14; A61L 2202/17; A61L 2/22; B08B 7/0057; B08B 1/02; B08B 1/04; B08B 3/022;
(Continued)

(56) References Cited

U.S. PATENT DOCUMENTS

| 7,560,706 B1* | 7/2009 | Castelluccio | A61L 2/10 250/365 |
|---|---|---|---|
| 2004/0147293 A1* | 7/2004 | Park | H04M 1/17 455/573 |

(Continued)

Primary Examiner — Alexander Markoff
(74) Attorney, Agent, or Firm — The Thornton Firm, LLC

(57) ABSTRACT

A cleaning and sanitizing apparatus for handheld devices may comprise a cuboid-shaped unit body having a top end and a base end, a slot opening, a user interface and microcontroller system for governing the individual components of the said cleaning and sanitizing apparatus for handheld devices, a gripping and carriage apparatus, a removeable cleaning solution reservoir, a pump and sprayer apparatus for dispensing cleaning solution, a moveable cleaning roller apparatus for cleaning the surfaces of handheld devices as such devices are lowered into and raised from the said unit body, and an irradiation chamber located at the base of the cuboid shaped body including at least one germicidal ultraviolet lamp array housed inside the said unit body. The apparatus may further comprise a wireless induction charging module configured to charge a handheld device while the handheld device is within the enclosure or compartment.

15 Claims, 15 Drawing Sheets

(58) Field of Classification Search
CPC .. A45C 11/00; A45C 2011/002; H02J 7/0044; H02J 50/10
See application file for complete search history.

(56) References Cited

U.S. PATENT DOCUMENTS

| | | | | |
|---|---|---|---|---|
| 2006/0147339 A1* | 7/2006 | Hunter | ............... | A61L 2/10 422/24 |
| 2006/0238503 A1* | 10/2006 | Smith | ............... | G06Q 99/00 345/156 |
| 2007/0075268 A1* | 4/2007 | Harris | ............... | A61L 2/10 250/455.11 |
| 2007/0175554 A1* | 8/2007 | Bertrand | ............... | B60C 23/0493 152/152.1 |
| 2008/0067417 A1* | 3/2008 | Lane | ............... | A61L 2/24 250/455.11 |
| 2008/0067418 A1* | 3/2008 | Ross | ............... | A61L 2/10 250/455.11 |
| 2008/0219883 A1* | 9/2008 | Thur | ............... | A61L 2/04 422/22 |
| 2009/0218512 A1* | 9/2009 | Ranta | ............... | A61L 2/10 250/455.11 |
| 2010/0044582 A1* | 2/2010 | Cooper | ............... | A61L 2/24 250/455.11 |
| 2013/0063922 A1* | 3/2013 | La Porte | ............... | A61L 2/10 361/807 |
| 2013/0256560 A1* | 10/2013 | Yerby | ............... | A61L 2/10 250/455.11 |
| 2015/0137747 A1* | 5/2015 | Salter | ............... | B60N 3/14 320/108 |
| 2016/0000953 A1* | 1/2016 | Bettles | ............... | A61L 2/24 250/455.11 |
| 2016/0045633 A1* | 2/2016 | Pagan | ............... | G02B 19/0023 422/24 |
| 2016/0074545 A1* | 3/2016 | Kim | ............... | H04R 1/12 250/455.11 |
| 2016/0158395 A1* | 6/2016 | Hughes | ............... | H04R 1/12 250/455.11 |
| 2016/0302567 A1* | 10/2016 | Gorelick | ............... | A46B 17/065 |
| 2017/0095584 A1* | 4/2017 | Martz | ............... | A61L 2/10 |
| 2017/0225206 A1* | 8/2017 | Deitchman | ............... | B08B 3/08 |
| 2017/0368214 A1* | 12/2017 | Levy | ............... | A61L 2/24 |
| 2019/0374664 A1* | 12/2019 | Kay | ............... | B08B 7/0057 |

\* cited by examiner

CLEANING AND SANITIZING APPARATUS FOR HANDHELD DEVICES

CROSS-REFERENCE TO RELATED APPLICATIONS

The present continuation-in-part patent application claims priority benefit of the U.S. nonprovisional application for patent Ser. No. 16/002,481 titled "Cleaning and Sanitizing Apparatus for Handheld Devices" filed on Jun. 7, 2018 under 35 U.S.C. 120. The contents of this related application are incorporated herein by reference for all purposes to the extent that such subject matter is not inconsistent herewith or limiting hereof.

RELATED CO-PENDING U.S. PATENT APPLICATIONS

Not applicable.

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

BACKGROUND OF THE INVENTION

1. Field of the Invention

The invention relates generally to the field of sanitizers for handheld devices. More specifically, the present invention relates to a device designed to clean, disinfect, UV sanitize and wirelessly charge a handheld device in a single process.

2. Description of the Related Art

The use of handheld devices has become ubiquitous in today's connected world. Along with this popularity, though, have come a number of unintended and unwanted consequences, among them being the spread of infectious diseases. Numerous studies have documented that handheld devices are frequently contaminated with bacterial, viral and fungal pathogens, yet they are seldom cleaned and disinfected due to individuals being unsure of what kind of products and methods to use to decontaminate said handheld devices. In certain settings, such as hospitals, the use of handheld devices poses a greater challenge against the spread of dangerous pathogens. The touchscreen nature, degree of portability, and high probability of use during the course of routine patient interaction has added an entirely different layer to infection prevention protocols.

Germicidal techniques and handheld device sanitizers are known in the art. Numerous methods inventions have been created and implemented to clean and sanitize handheld devices. Two popular methods chiefly used by such handheld device sanitizers are the application of a chemical sanitizing agent and the irradiation of the handheld device with ultraviolet radiation.

The application of chemical sanitizers such as alcohols or surfactants with a scratch-resistant cloth is a widely accepted means of cleaning a mobile device's surface. Such a cleaning method is simple and is more effective in removing large particulate matter and/or fingerprints and smudges from a mobile device's surface. However, such a method may not be completely effective in sanitizing a handheld device. Furthermore, simple chemical sanitizing methods are time consuming and involve contact with potentially irritating chemicals.

As an alternative to chemical cleaners and sanitizers, ultraviolet irradiation devices have become widely used. These devices essentially consist of a clamshell-style container where a handheld device is inserted, the sanitizing device is closed, and ultraviolet lights irradiate the handheld device for a desired length of time. Such ultraviolet irradiation has proven itself highly effective in killing pathogens, and several devices include a charging means for handheld devices. However, irradiation of a mobile device will not remove large particulate matter and/or fingerprints and smudges from the surface. Furthermore, many of today's popular ultraviolet sanitizers are burdensome to operate and require the user to spend extra time connecting a device to USB or USB-type connector in order to charge the device. Moreover, today's popular ultraviolet sanitizers employ irradiation techniques which may not irradiate an entire device, only irradiating the front and rear surfaces.

In view of the foregoing, it is clear that there exists a need for an apparatus designed to clean, disinfect, UV sanitize, and wirelessly charge a handheld device in a simple and easy-to-understand process.

SUMMARY

The present invention is directed towards a device designed to clean, disinfect, UV sanitize and wirelessly charge a handheld device in a simple process. The exemplary cleaning and sanitizing apparatus for handheld devices may be configured to sanitize any number of different types of handheld devices including, but not limited to, smartphones, tablet computing devices, portable media devices, digital cameras, video recorders, audio recorders, portable gaming devices, electronic reading devices, personal digital assistants (PDAs), and other handheld electronic devices.

As disclosed herein, the exemplary cleaning and sanitizing apparatus for handheld devices may comprise a cuboid-shaped unit body having a top end and a base end, a slot opening located on the top of the said cuboid-shaped unit body configured to accept handheld devices, a user interface and microcontroller system for governing the individual components of the said cleaning and sanitizing apparatus for handheld devices, a gripping and carriage apparatus for securing, lowering and raising handheld devices into and from said unit body, a removeable cleaning solution reservoir, an access door for access to, and protecting, the said removeable cleaning solution reservoir, a housing for accommodating the said removeable cleaning solution reservoir, a pump and sprayer apparatus for dispensing cleaning solution, a moveable cleaning roller apparatus for cleaning the surfaces of handheld devices as the said handheld devices are lowered into and raised from the said unit body, and an irradiation chamber located at the base of the cuboid shaped body including at least one germicidal ultraviolet lamp array housed inside the said unit body. The apparatus may further comprise a wireless induction charging module configured to charge the handheld device while the handheld device is within the enclosure or compartment (and/or while the handheld device is being sanitized by electromagnetic radiation). In some embodiments, the apparatus may comprise one or more indicators configured to display sanitization and/or charging status information to a user.

The exemplary cleaning and sanitizing apparatus for handheld is designed to kill a broader variety of bacteria, fungi, viruses and other pathogens than existing devices on the market today. The use of a cleaning solution in combination with the use of an irradiation chamber employing an array of multiple lamps capable of emitting multiple wavelengths of germicidal ultraviolet radiation allows for greater germicidal capabilities in an easy-to-use and attractive device.

Use of the exemplary handheld device is designed to be user-friendly. A user places a handheld device into a slot at the top of the unit where the device is secured by self-centering grippers located on the outer perimeter of an elevator carriage. The user may then press one of a series of buttons as part of a user interface located on the top of the unit which corresponds with a different mode of cleaning and sanitizing and may include additional features such as wireless charging.

Once the device is secured and a cleaning and charging mode is selected, the handheld device is then drawn into the apparatus for physical cleaning and sanitizing. The secured handheld device is drawn into the device body by an electric motor means and guided past a cleaning roller while contemporaneously triggering a spray actuator which dispenses a cleaning solution from a container located close to the cleaning roller apparatus. The cleaning solution may be applied directly to the surface of a handheld device or to a cleaning roller. Ultimately, the cleaning solution will be used to clean the handheld device. The rotating cleaning roller with cleaning solution removes debris and oils from the front surface of the handheld device.

After passing through the cleaning roller apparatus, the handheld device is drawn completely into an irradiation chamber at the base of the unit body. In the irradiation chamber, an array of at least four germicidal ultraviolet emitting devices irradiate the handheld device with electromagnetic radiation capable of disinfecting and sanitizing the surface of a handheld device. Additionally, a wireless induction charging unit may be activated. Depending on which mode the user selects, the handheld device will remain at the bottom or base of the unit while the germicidal ultraviolet emitting devices and wireless charging unit remain on.

When the user selected mode is complete, an electric motor means raises the secured handheld device in the opposite direction to which the handheld device was lowered and out from the device slot. The self-centering grippers are then released and the user may then remove the cleaned and sanitized handheld device from the apparatus.

BRIEF DESCRIPTION OF THE DRAWINGS

The invention directed by way of example, and not by way of limitation, in the figures of the accompanying drawings and in which like reference numerals refer to similar elements and in which.

Figure 1:
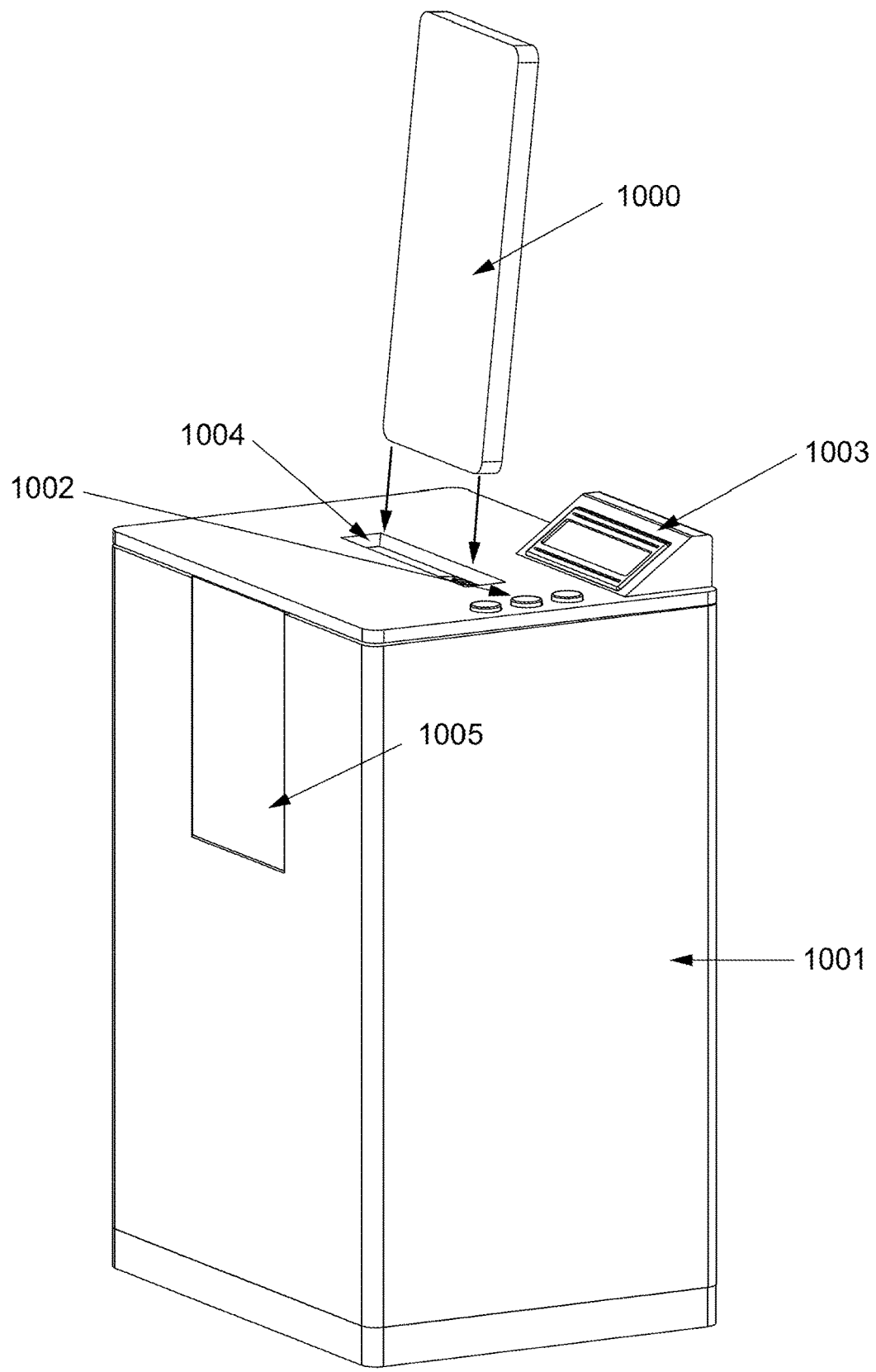
FIG. 1 is an isometric illustration of an exemplary cleaning and sanitizing apparatus for handheld devices in accordance with an embodiment of the invention.

Unless otherwise indicated illustrations in the figures are not necessarily drawn to scale.

DETAILED DESCRIPTION OF THE PREFERRED EMBODIMENTS

Terminology used herein is used for the purpose of describing particular embodiments only, and is not intended to limit the scope of the present invention. It must be understood that as used herein and in the appended claims, the singular forms "a," "an," and "the" include the plural reference unless the context clearly dictates otherwise. For example, a reference to "an element" is a reference to one or more elements and includes all equivalents known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Language that may be construed to express approximation should be so understood unless the context clearly dictates otherwise.

Unless defined otherwise, all technical and scientific terms used herein have the same meanings as commonly understood by a person of ordinary skill in the art to which this invention belongs. Preferred methods, techniques, devices, and materials are described. But any methods, techniques, devices, or materials similar or equivalent to those described herein may be used in the practice or testing of the present invention. Structures described herein should also be understood to refer to functional equivalents of such structures.

References to "one embodiment," "one variant," "an embodiment," "a variant," "various embodiments," "numerous variants," etc., may indicate that the embodiment(s) of the invention so described may include particular features, structures, or characteristics. However, not every embodiment or variant necessarily includes the particular features, structures, or characteristics. Further, repeated use of the phrase "in one embodiment," or "in an exemplary embodiment," or "a variant," or "another variant," do not necessarily refer to the same embodiment although they may. A description of an embodiment with several components in communication with each other does not imply that all such components are required. On the contrary, a variety of optional components are described to illustrate the wide variety of possible embodiments and/or variants of the present invention.

A "computer" may refer to one or more apparatus and/or one or more systems that are capable of accepting a structured input, processing the structured input according to prescribed rules, and producing results of the processing as output. Examples of a computer may include: a personal computer (PC); a stationary and/or portable computer; a computer having a single processor, a computer having multiple processors, or a computer having multi-core processors, which may operate in parallel and/or not in parallel; a general purpose computer; a supercomputer; a mainframe; a super mini-computer; a mini-computer; a workstation; a micro-computer; a server; a client; an interactive television; a web appliance; a telecommunications device with internet access; a hybrid combination of a computer and an interactive television; a portable computer; a tablet personal computer; a personal digital assistant (PDA); a portable telephone; a portable smartphone; wearable devices such as smartwatches; application-specific hardware to emulate a computer and/or software, such as, for example, a digital signal processor (DSP), a field-programmable gate array (FPGA), an application specific integrated circuit (ASIC), an application specific instruction-set processor (ASIP), a chip, chips, a system on a chip, or a chip set; a data acquisition device; an optical computer; a quantum computer; a biological computer; and generally, an apparatus that may accept data, process data according to one or more stored software programs, generate results, and typically include input, output, storage, arithmetic, logic, and control units.

The term "processor" may refer to any device or portion of a device that processes electronic data from registers and/or memory to transform that electronic data into other electronic data that may be stored in registers and/or memory. A "computing platform" may comprise one or more processors.

A "microcontroller" generally refers a small computer on a single integrated circuit. A microcontroller contains one or more central processing units (processor cores) along with memory and programmable input/output peripherals. A typical microcontroller includes a processor, memory and input/output (I/O) peripherals on a single chip.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

It will be readily understood by persons skilled in the art that the various methods and algorithms described herein may be implemented by appropriately programmed computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

"Software" may refer to prescribed rules and/or instructions used to operate a computer. Examples of software may include: code segments in one or more computer-readable languages; graphical and or/textual instructions; applets; pre-compiled code; interpreted code; compiled code; and computer programs. An operating system or "OS" is software that manages computer hardware and software resources and provides common services for computer programs.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software program code for carrying out operations for aspects of the present invention can be written in any combination of one or more suitable programming languages, including an object oriented programming languages and/or conventional procedural programming languages, and/or programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Smalltalk, Perl, UNIX Shell, Visual Basic or Visual Basic Script, Virtual Reality Markup Language (VRML), ColdFusion™, SQL, Python. or other compilers, assemblers, interpreters or other computer languages or platforms.

Aspects of the present invention will be described below with reference to flowchart illustrations and/or block diagrams of methods, apparatus (systems) and computer program products according to embodiments of the invention. It will be understood by persons having skill in the art that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, microcontroller, or other programmable data processing apparatus to produce a machine, such that the instructions, which execute via the processor of the computer or other programmable data processing apparatus, create a means for implementing the functions/acts specified in the flowchart and/or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). In alternative implementations of the present invention, the functions noted in each block may occur out of the order noted in the figures. For example, two blocks shown in succession may, in fact, be executed substantially concurrently, or the blocks may sometimes be executed in the reverse order, depending upon the functionality involved. Persons having skill in the art will understand that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Such computer program instructions may also be stored in a computer readable medium that can direct a computer, microcontroller, other programmable data processing apparatus, or other devices to function in a particular manner, such that the instructions stored in the computer readable medium produce an article of manufacture including instructions which implement the function/act specified in the flowchart and/or block diagram block or blocks.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

It will be readily apparent that the various methods and algorithms described herein may be implemented by, e.g., appropriately programmed general purpose computers and computing devices. Typically, a processor (e.g., a microprocessor) will receive instructions from a memory or like device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read. Various forms of computer readable media may be involved in carrying sequences of instructions to the processor. For example, sequences of instruction (i) may be delivered from RAM to a processor, (ii) may be carried over a wireless transmission medium, and/or (iii) may be formatted according to numerous formats, standards or protocols, such as Bluetooth, TDMA, CDMA, 3G.

A "handheld device" may refer to any portable device that can be carried and held in one's palm. A handheld device may be any computing or electronic device that is compact and portable enough to be held and used in one or both hands. Typically, any handheld computing device will have a flatscreen interface, providing a touchscreen interface with digital buttons and keyboard or physical buttons along with a physical keyboard. Many such devices can connect to the Internet or World Wide Web ("WWW") and interconnect with other devices such as car entertainment systems or headsets via Wi-Fi, Bluetooth, cellular networks, or various forms of near field communication (NFC). Handheld devices may include integrated cameras and other peripheral devices.

"Ultraviolet germicidal irradiation" or "UVGI" is a germicidal technique where ultraviolet radiation is used to kill or inactivate microorganisms. Ultraviolet radiation is mutagenic to bacteria, viruses and other microorganisms, with short-wavelength ultraviolet radiation considered to be "germicidal" at wavelengths between 100-280 nanometers.

As is well known to those skilled in the art, many careful considerations and compromises typically must be made when designing the optimal manufacture or commercial implementation of such an cleaning and sanitizing apparatus for handheld devices. A commercial implementation in accordance with the spirit and teachings of the invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art.

The exemplary cleaning and sanitizing apparatus for handheld devices will now be described in detail with reference to embodiments thereof as illustrated in the accompanying drawings.

FIG. 1 is an isometric illustration of an exemplary cleaning and sanitizing apparatus for handheld devices in accordance with an embodiment of the invention. The outward appearance of the exemplary cleaning and sanitizing device reveals a generally cuboid shaped unit body 1001 having a top end and a base end. The body could be made from such materials as, but not limited to, plastic or stainless steel. Furthermore, the unit body could be ornamentally designed to resemble the appearance of known devices such as, but not limited to, a kitchen toaster. On the top end of the cuboid shaped unit body 1001 is a user interface, which in the preferred embodiment of the invention consists of a series of buttons 1002 and an electronic display 1003. A device slot 1004 is located on the top and center part of the unit body 1001. A handheld device 1000 may fit into the device slot 1004 for cleaning and sanitizing. The width of the device slot may be designed to accommodate handheld devices of varying widths. On one side of the unit body 1001 is an access door 1005 for access to, and for protecting, a removeable cleaning solution reservoir and a housing for accommodating the said removeable cleaning solution reservoir. The access door 1005 may also be used to access the components located inside the cuboid shaped unit body. In the preferred embodiment of the invention, the access door 1005 is located on the front of the unit body 1001. It will be understood by persons having skill in the art that such a spray reservoir access door may consist of a simple hinge and latch mechanism which may be implemented in numerous ways.

Figure 2:
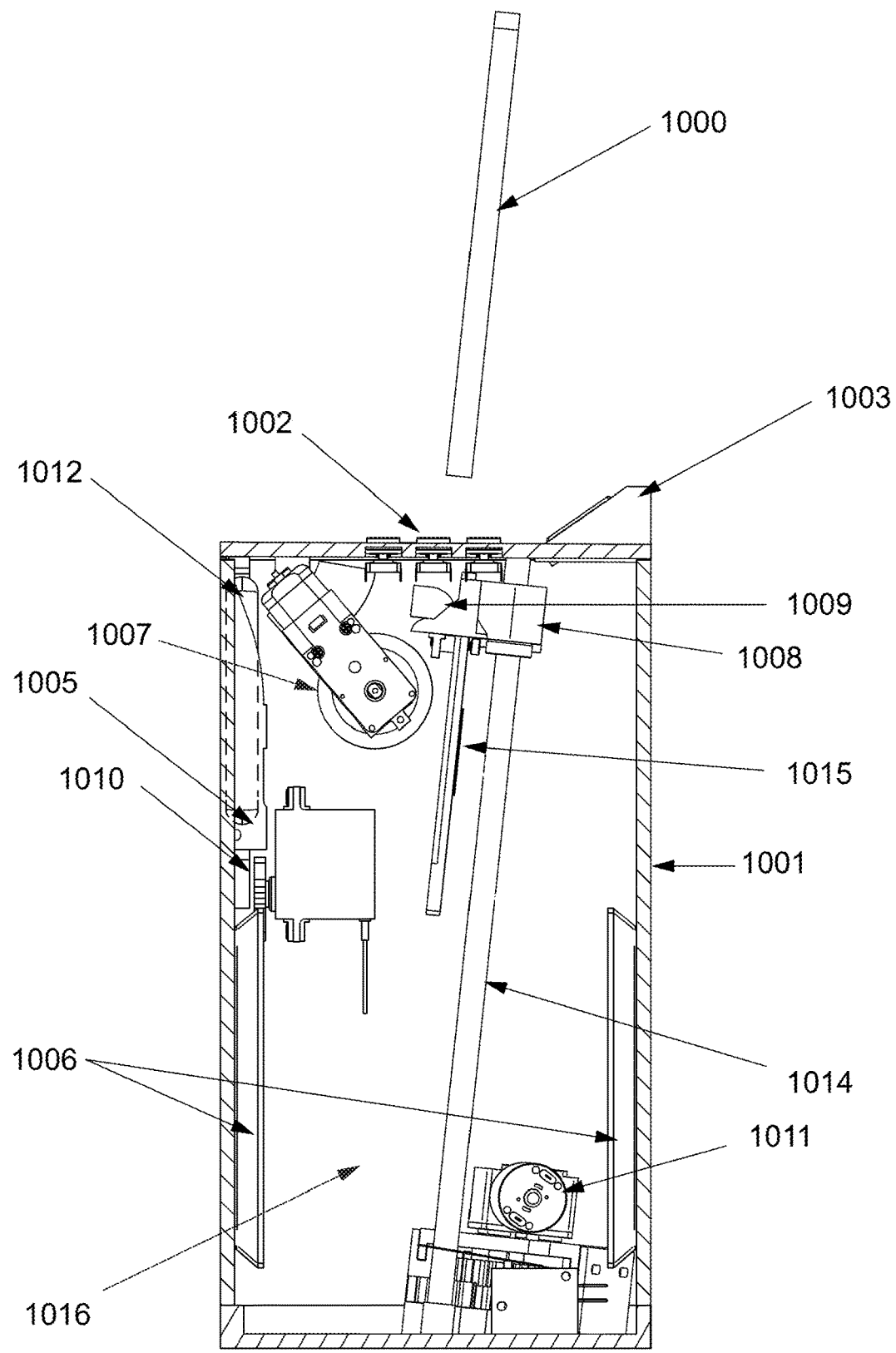
FIG. 2 is a side sectional view of an exemplary cleaning and sanitizing apparatus for handheld devices in accordance with an embodiment of the invention.

FIG. 2 is a side sectional view of an exemplary cleaning and sanitizing apparatus for handheld devices in accordance with an embodiment of the invention. In the preferred embodiment of the invention, the interior of the unit body 1001 contains a moveable cleaning roller apparatus for cleaning the surfaces of handheld devices including a cleaning roller 1007, an elevator carriage 1008, self-centering grippers 1009, a spray actuator arm 1010, a cleaning spray container 1012, a wireless induction charging apparatus or unit 1015, and at least one germicidal ultraviolet radiation emitting devices 1006. In the preferred embodiment of the invention, the apparatus employs an irradiation chamber 1016 located at the base end of the cuboid shaped unit body 1001. The irradiation chamber 1016 may consist of an array of one or more germicidal ultraviolet emitting devices. In the preferred embodiment of the invention, the array consists of at least four germicidal ultraviolet emitting devices spaced apart in such a manner so as to surround a handheld device and provide optimal germicidal UV radiation to a greater surface area of the handheld device. Such ultraviolet radiation emitting devices may comprise any suitable ultraviolet radiation source, including, but not limited to, a light emitting diode (LED) assembly, an electric arc lamp, a gas-discharge lamp, a fluorescent lamp, or the like. The irradiation chamber may further comprise one or more mirrors, reflective surfaces, and/or lenses to reflect and redirect germicidal UV radiation to a greater surface area of a handheld device. In embodiments of the invention, the array of four germicidal light emitting devices may emit germicidal radiation of differing wavelengths, with some light emitting devices emitting radiation of a certain wavelength and others emitting differing wavelengths, so as to provide a broader range of germicidal irradiation. In various embodiments of the invention, such an irradiation chamber 1016 may include a cradle to hold a handheld device in position so as to provide greater stability as well as to raise gripping and carriage apparatus so as to provide greater germicidal irradiation and greater access to the wireless induction charging apparatus.

Figure 3:
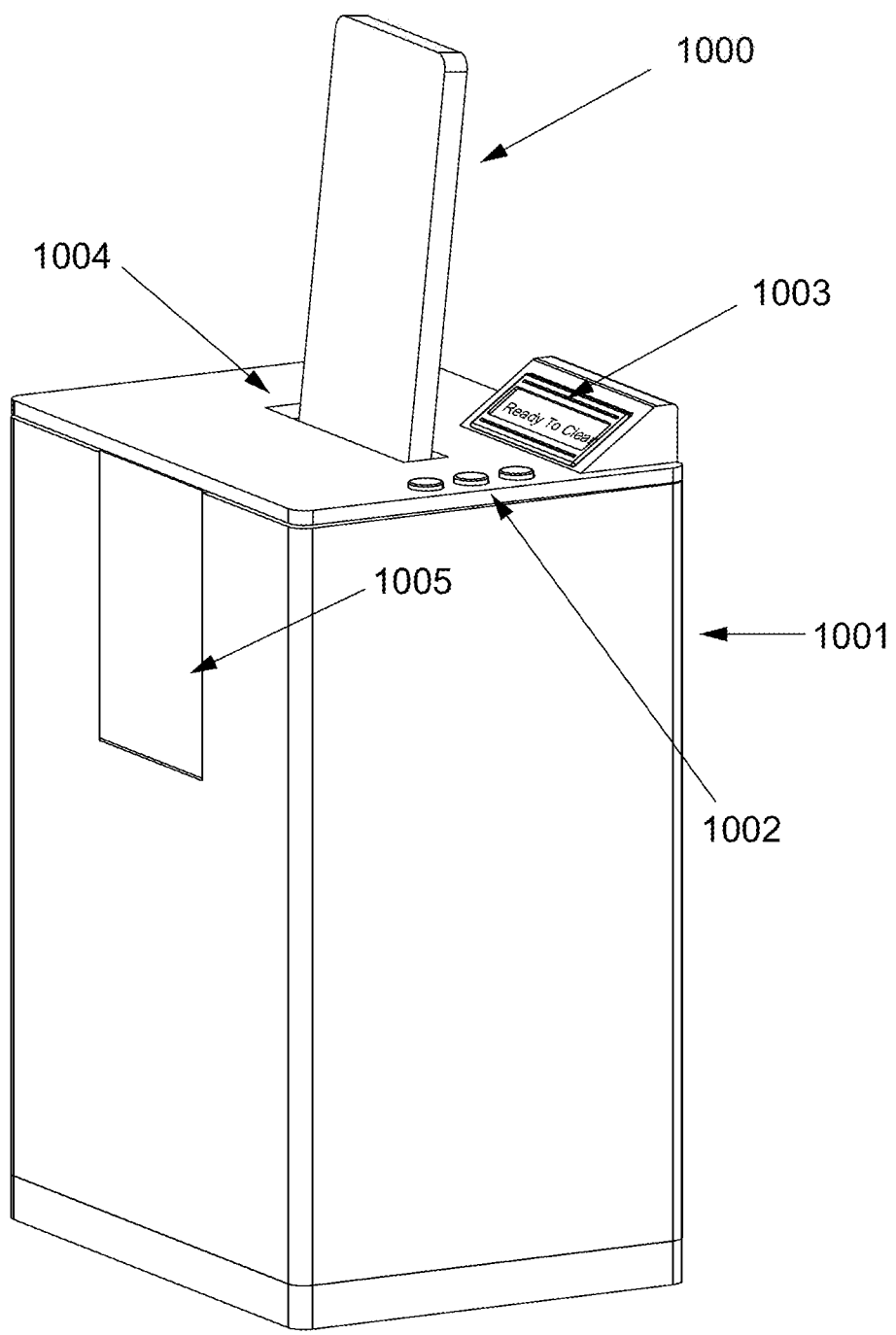
FIG. 3 is an isometric cutaway illustration of an exemplary cleaning and sanitizing apparatus for handheld devices in accordance with an embodiment of the invention.

FIG. 3 is an isometric cutaway illustration of an exemplary cleaning and sanitizing apparatus for handheld devices in accordance with an embodiment of the invention. In this view, a handheld device 1000 has been inserted into the device slot 1004. In one embodiment of the invention, a user interface includes a plurality of buttons 1002 which are available for a user to enter the type and duration of cleaning and sanitizing for a handheld device 1000. A display 1003 may be included to aid the user in determining the type and duration of cleaning and sanitizing for a handheld device 1000. Furthermore, the display 1003 may provide a user with details such as, but not limited to, time remaining on cycle or error messages. Persons having skill in the art will readily appreciate that a display 1003 may be implemented in numerous ways such as, but not limited to, an LCD or an LED display and may be integrated with a microcontroller means which governs the functions of the exemplary cleaning and sanitizing apparatus for handheld devices.

Figure 4:
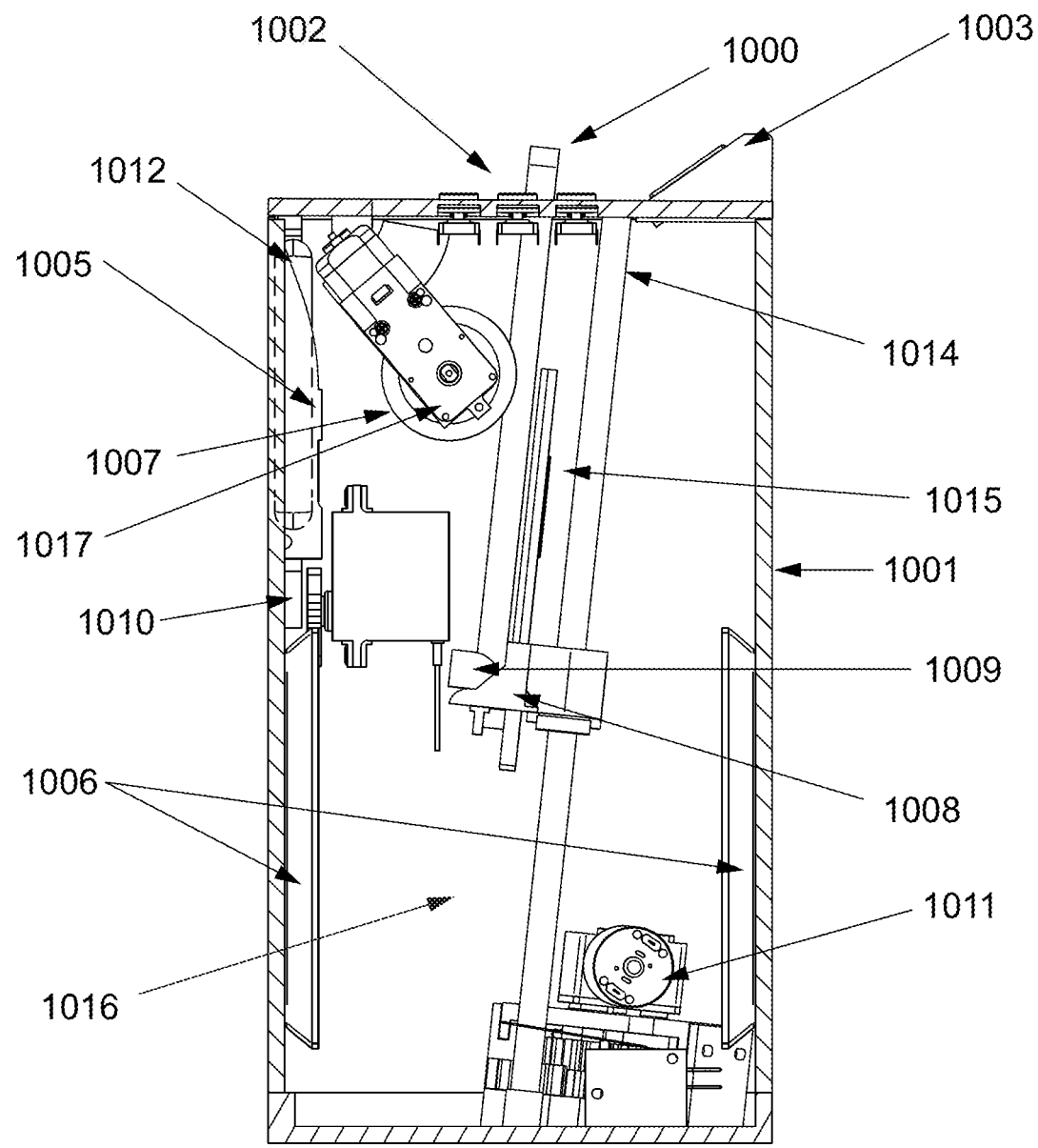
FIG. 4 is a side sectional view of an exemplary cleaning and sanitizing apparatus for handheld devices in accordance with an embodiment of the invention.

FIG. 4 is a side sectional view of an exemplary cleaning and sanitizing apparatus for handheld devices in accordance with an embodiment of the invention. In this view, a handheld device 1000 has been inserted into the device slot 1004. In an embodiment of the invention, a user interface includes a plurality of buttons 1002 which are available for a user to enter the type and duration of cleaning and sanitizing for a handheld device 1000. A display 1003 may be included to aid the user in determining the type and duration of cleaning and sanitizing for a handheld device 1000. Self-centering grippers 1009 located on the elevator carriage 1008 activate to grip and center the handheld device 1000. An electric motor 1011 turns a threaded drive rod which draws the handheld device 1000 now secured in the elevator carriage 1008 into the unit 1001 for physical cleaning as it is guided past the cleaning roller 1007. A smooth guide rod 1013 is provided for added stability and rigidity. A moveable cleaning roller apparatus for cleaning the surfaces of handheld devices then engages the handheld device to apply friction and a cleaning solution to the viewing surface of the handheld device 1000. The moveable cleaning roller apparatus generally comprises a consists of a roller motor 1017, an engagement means, and at least one interchangeable cleaning roller 1007. Persons skilled in the art will readily appreciate that the engagement means may consist of springs or a separate motor mechanism.

The invention may employ a pump and sprayer apparatus for dispensing cleaning solution. In the preferred embodiment of the invention, a spray actuator arm 1010 will apply pressure to the removeable cleaning solution reservoir 1012 so that the cleaning solution is then sprayed on the cleaning roller 1007 and ultimately the handheld device 1000. Persons having skill in the art will readily appreciate that there are numerous alternative ways to dispense cleaning solution from a container such as, but not limited to, a valve opening or a pressure pump.

The rotating cleaning roller 1007 is pressed against the handheld device 1000 while it is moved past, removing debris and oils from the front surface of the handheld device 1000. Once the handheld device 1000 is drawn completely into the irradiation chamber 1016 at the base of the unit body

1001, germicidal UV lamps 1006 and wireless charging unit 1015 are activated. In the preferred embodiment of the invention, the irradiation chamber 1016 includes a germicidal ultraviolet lamp array includes at least four ultraviolet lamps spaced apart in such a manner so as to surround a handheld device and provide optimal germicidal UV radiation to a greater surface area of a handheld device. Depending on which mode the user selects, the handheld device 1000 will remain in the irradiation chamber 1016 located at the base end of the unit body 1001 while the germicidal UV lamps and wireless charging unit remain on.

Figure 5:
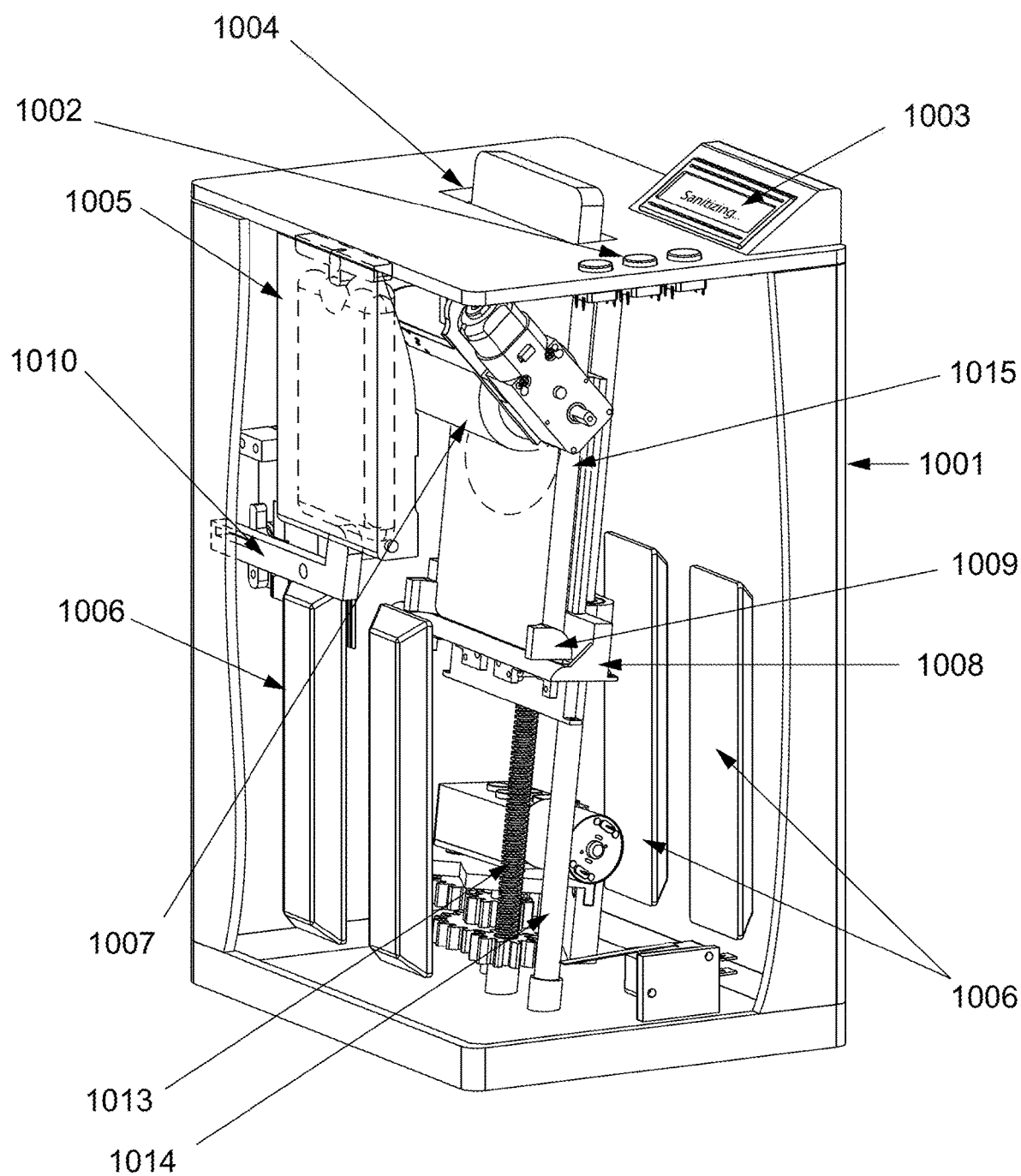
FIG. 5 is an isometric cutaway illustration of an exemplary cleaning and sanitizing apparatus for handheld devices in accordance with an embodiment of the invention.

FIG. 5 is an isometric illustration of an exemplary cleaning and sanitizing apparatus for handheld devices in accordance with an embodiment of the invention. In this view, a handheld device 1000 has been inserted into the device slot 1004. Self-centering grippers 1009 located on the elevator carriage 1008 activate to grip and center the handheld device 1000. An electric motor 1011 turns a threaded drive rod 1014 which draws the handheld device 1000 now secured in the elevator carriage 1008 into the unit 1001 for physical cleaning by a moveable cleaning roller apparatus for cleaning the surfaces of handheld devices as the said handheld devices are lowered into and raised from the said unit body. A smooth guide rod 1013 is provided for added stability and rigidity. In the preferred embodiment of the invention, as a pump and sprayer apparatus, the spray actuator arm 1010 arm will apply pressure to the removeable cleaning solution reservoir 1012 so that the cleaning solution is then sprayed on the cleaning roller 1007 and handheld device 1000. The rotating cleaning roller is pressed against the handheld device 1000 while it is moved past, removing debris and oils from the front surface of the handheld device 1000. In alternative embodiments of the invention, the pump and sprayer apparatus may take on forms such as, but not limited to, electric pump mechanisms and electric sprayers.

Figure 6:
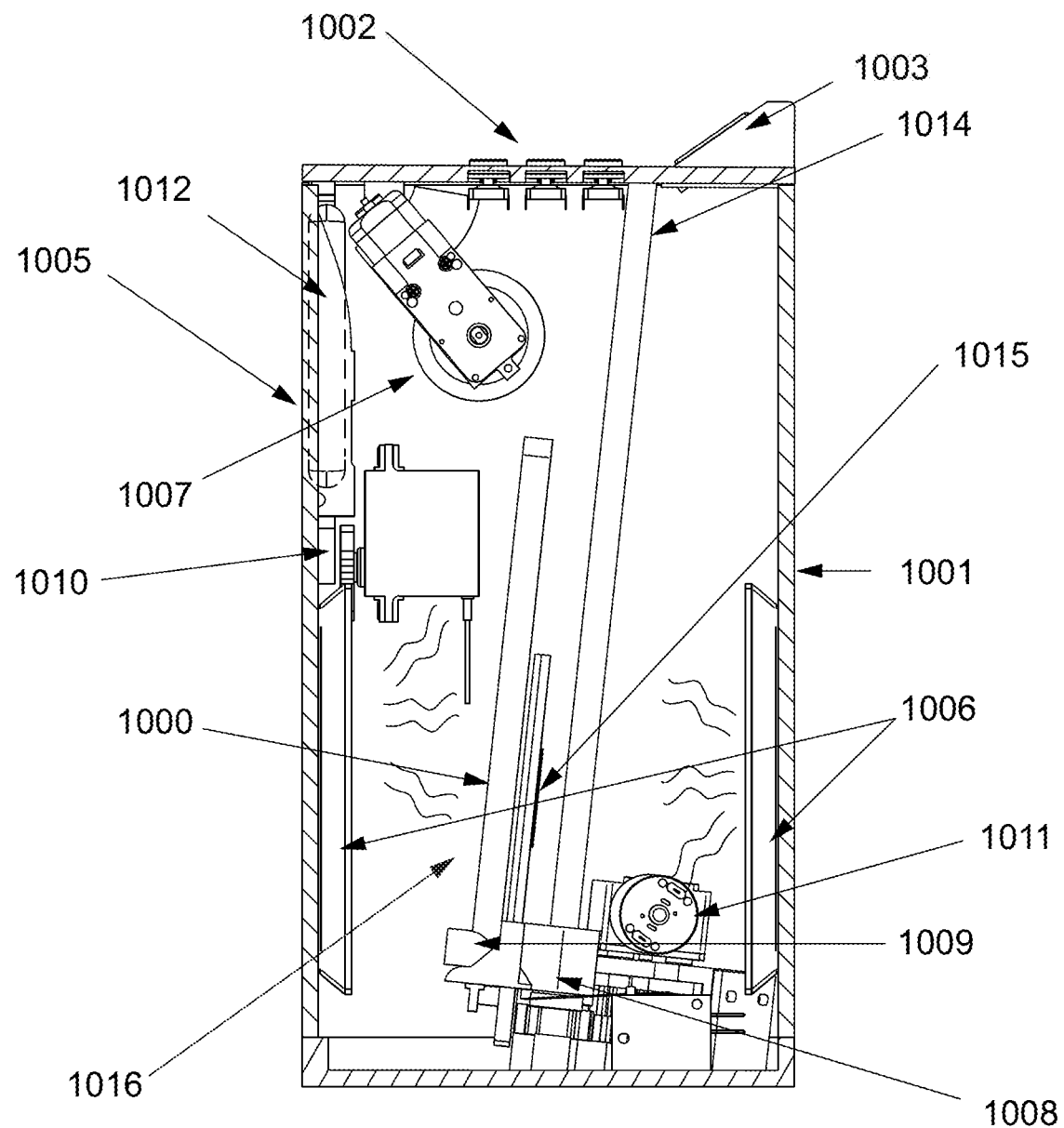
FIG. 6 is a side sectional view of an exemplary cleaning and sanitizing apparatus for handheld devices in accordance with an embodiment of the invention.

FIG. 6 is a side sectional view of an exemplary cleaning and sanitizing apparatus for handheld devices in accordance with an embodiment of the invention. Once the handheld device 1000 is drawn into the irradiation chamber of the unit 1001, germicidal UV lamps and wireless induction charging unit 1015 are activated and ultraviolet germicidal irradiation commences. Based on which mode the user selects, the handheld device 1000 will remain in the irradiation chamber 1016 at the base of the unit 1001 while the germicidal UV lamps and wireless charging unit remain on. Once the user selected mode is complete, the unit 1001 will return the handheld device through the slot at the top and release the self-centering grippers 1009 so a user may remove the handheld device 1000 from the unit 1001.

Figure 7:
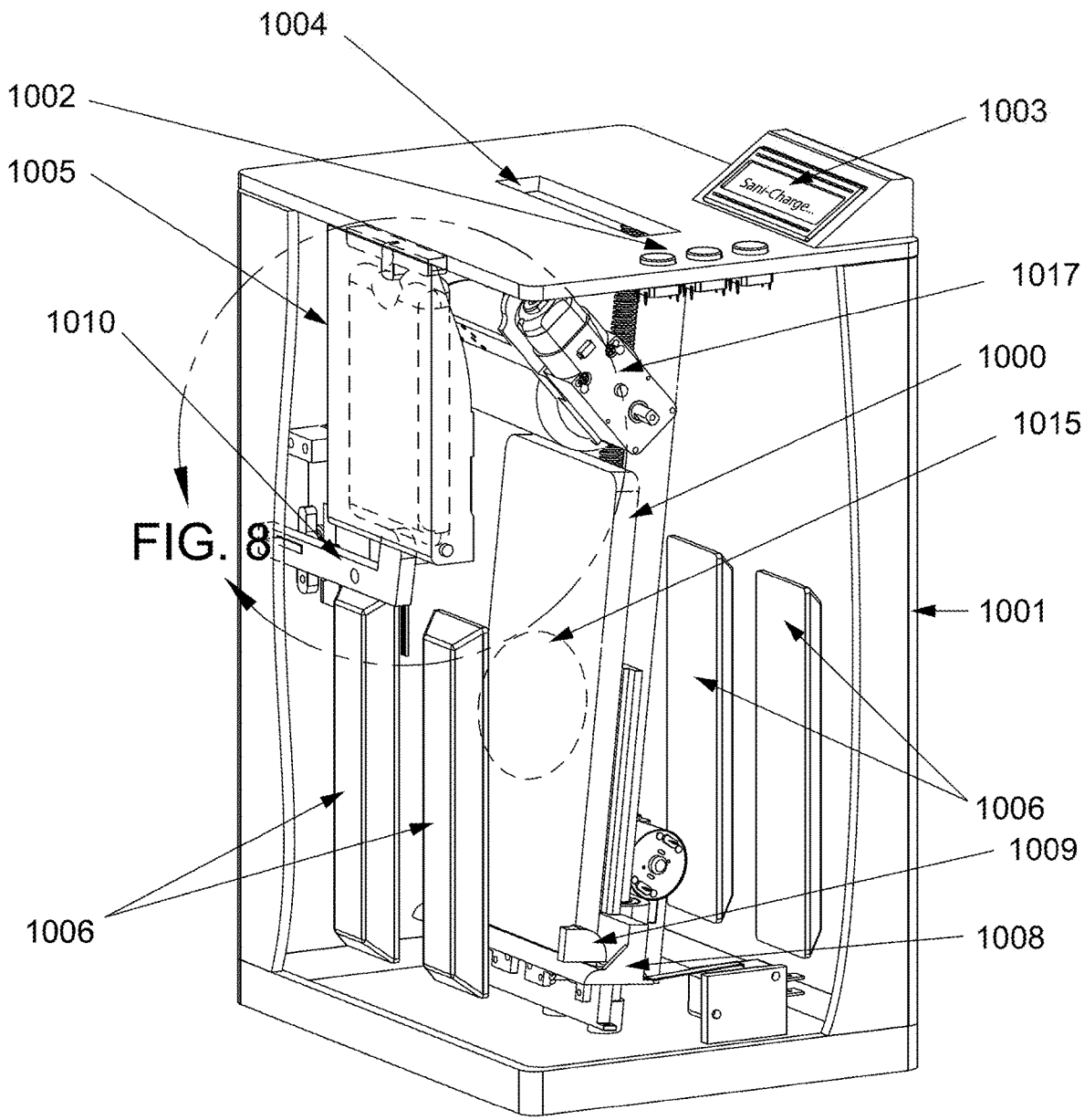
FIG. 7 is an isometric cutaway illustration of an exemplary cleaning and sanitizing apparatus for handheld devices in accordance with an embodiment of the invention.

FIG. 7 is a sectional isometric illustration of an exemplary cleaning and sanitizing apparatus for handheld devices in accordance with an embodiment of the invention. As with FIG. 6, once the handheld device 1000 is drawn completely into the irradiation chamber at the base of the unit 1001, germicidal UV lamps and wireless induction charging unit 1015 are activated and ultraviolet germicidal irradiation commences. In the preferred embodiment of the invention, the wireless inductive charging apparatus is positioned in the irradiation chamber in such a manner so as not to interfere with light propagated from the germicidal lamp array. Based on which mode the user selects, the handheld device 1000 will remain at the bottom of the unit 1001 while the germicidal UV lamps 1006 and wireless charging unit remain on. The charging unit 1015 may be configured to charge or recharge the handheld device 1000. In the preferred embodiment, the charging unit may comprise an inductive coil to transfer power wirelessly to the handheld device. Alternative embodiments of the invention include a connector which may be further configured to act as a physical docking connector which plugs into the handheld device 1000, such as, but not limited to, a Universal Serial Bus (USB) connector, mini-USB connector, micro-USB connector.

Figure 8:
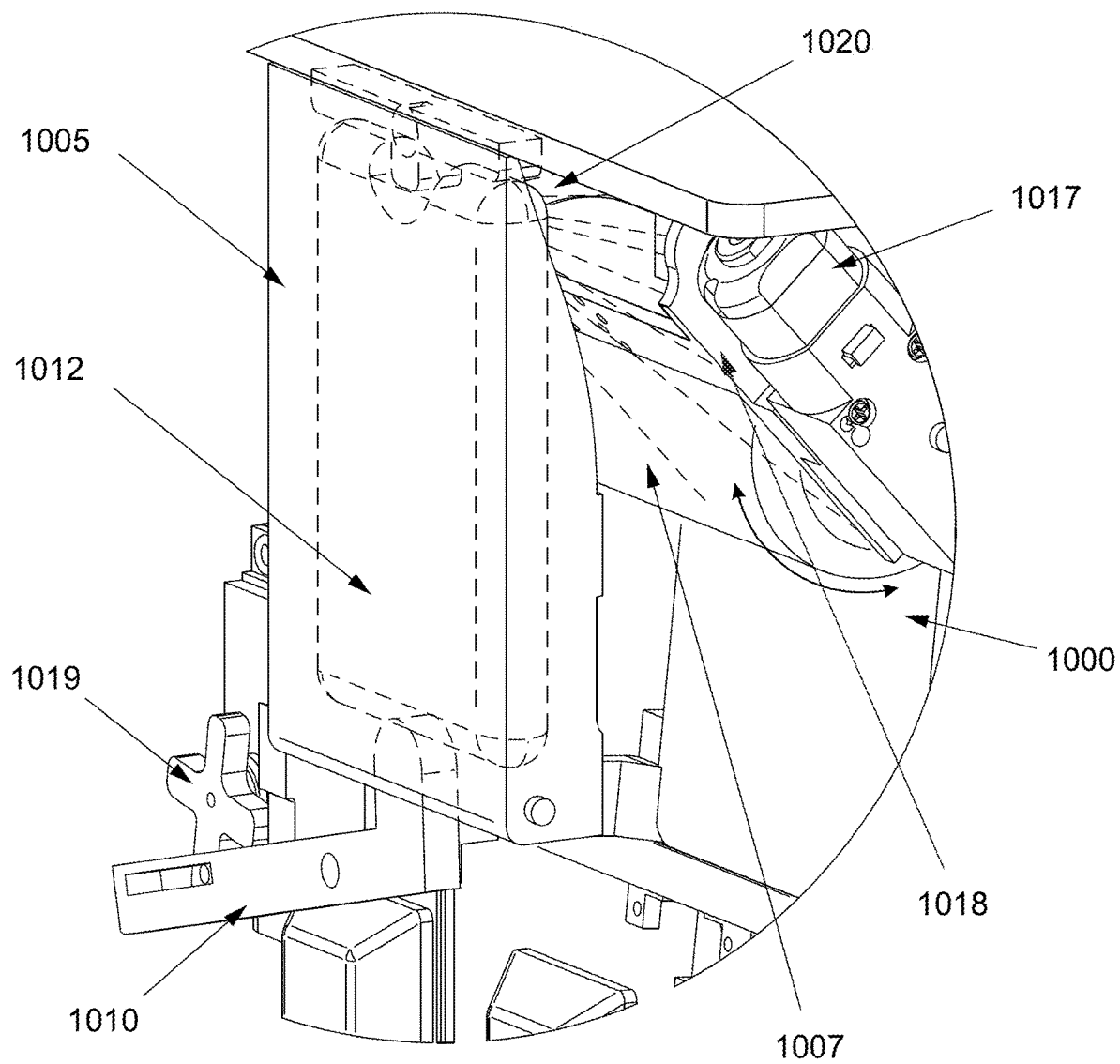
FIG. 8 is an enlarged view of the spray and cleaning roller assembly of an exemplary cleaning and sanitizing apparatus for handheld devices in accordance with an embodiment of the invention.

FIG. 8 is an enlarged view of the cleaning roller assembly means of an exemplary cleaning and sanitizing apparatus for handheld devices in accordance with an embodiment of the invention. The cleaning roller apparatus employs a pump and sprayer apparatus for dispensing cleaning solution. In the preferred embodiment of the invention, while moving into the unit body, the secured handheld device 1000 triggers a spray actuator motor 1019 which moves a spray actuator arm 1010 which will then press or compress the removeable cleaning solution reservoir 1012 so that the cleaning solution is then applied on the cleaning roller 1007. Persons skilled in the art will readily appreciate that a cleaning solution may be applied to the cleaning roller 1007 through a nozzle 1020 or any other comparable application means known and understood in the art. A roller motor 1017 turns the cleaning roller 1007 which is activated when the handheld device is drawn into and from the exemplary cleaning and sanitizing apparatus. Such a roller motor may be an electric motor known and understood in the art. The cleaning roller 1007 has an absorbent surface such as, but not limited to, microfiber or sponge which is held in place by a means such as, but not limited to, a bracket and/or tension springs 1018 configured to frictionally engage or hold the cleaning roller 1007 against the handheld device 1000 while it is moved past the engaged cleaning roller 1007, removing debris and oils from the front surface of the handheld device 1000. In alternative embodiments of the invention, multiple cleaning roller assemblies or apparatuses may be used so as to clean both sides of a handheld device.

Persons having skill in the art will readily appreciate that a pump and sprayer apparatus facilitates the application of cleaning solution, and may be achieved in varying ways such as, but not limited to, an actuator motor 1019 engaged with an actuator arm 1010 applying pressure to the removeable cleaning solution reservoir 1012. In an embodiment of the invention, a removeable cleaning solution reservoir 1012 is removably located behind a cleaning spray container access door 1005. The cleaning solution reservoir may be a refillable plastic reservoir, or it may be configured in such a way to be a one-time use container which is required to be replaced when empty. The cleaning solution reservoir may be made from a pliable material so as to move fluid from the reservoir when any external force or pressure is applied. The cleaning solution may be chosen among any number of cleaning and/or sanitizing solutions such as, but not limited to, all-purpose cleaners, an alcohol-based solution, phenol derivatives, an anionic surfactant and non-ionic surfactant solution, an aqueous ammonia solution and/or numerous others well known and appreciated in the art. In various embodiments of the invention, the removeable cleaning solution reservoir may be a refillable reservoir or sold as prefilled, disposable units.

Use of the exemplary handheld device is designed to be user-friendly. A user places a handheld device 1000 into slot at the top of the unit 1001. The user may press one of a series of buttons 1002 on the top of the unit. Each button may correspond with a different mode of cleaning and sanitizing and may include additional features such as wireless charging. Once inserted, the handheld device is secured by self-centering grippers 1009 located on the outer perimeter of the elevator carriage 1008.

Once secured by the self-centering grippers 1009, the handheld device is then drawn into the unit 1001 for physical cleaning and is guided past the cleaning roller 1007. An electric motor means turns a threaded drive rod 1013 whose threads are engaged to the elevator carriage 1008 which serves to raise and lower the handheld device 1000. While descending into the unit body 1001, the secured handheld device 1000 triggers a spray actuator arm 1010 which will then press the removeable cleaning solution reservoir 1012 so that the cleaning solution is then sprayed on the cleaning roller 1007 and ultimately handheld device 1000. The rotating cleaning roller is pressed by a mechanical means against the handheld device 1000 while it is moved past the engaged cleaning roller 1007, removing debris and oils from the front surface of the handheld device 1000.

Once the handheld device 1000 is drawn completely into the irradiation chamber at the base of the unit 1001, germicidal ultraviolet emitting devices 1006 and the wireless charging unit 1015 are activated. Depending on which mode the user selects, the handheld device 1000 will remain at the bottom of the unit 1001 while the germicidal ultraviolet emitting devices 1006 and wireless charging unit 1015 remain on.

When the user selected mode is complete, an electric motor means turns the threaded drive rod 1013 in the opposite direction to which the handheld device was lowered, which raises the handheld device 1000 still secured in the elevator carriage 1008 from the unit 1001 past the cleaning roller 1007 and out from the device slot 1004.

Figure 9:
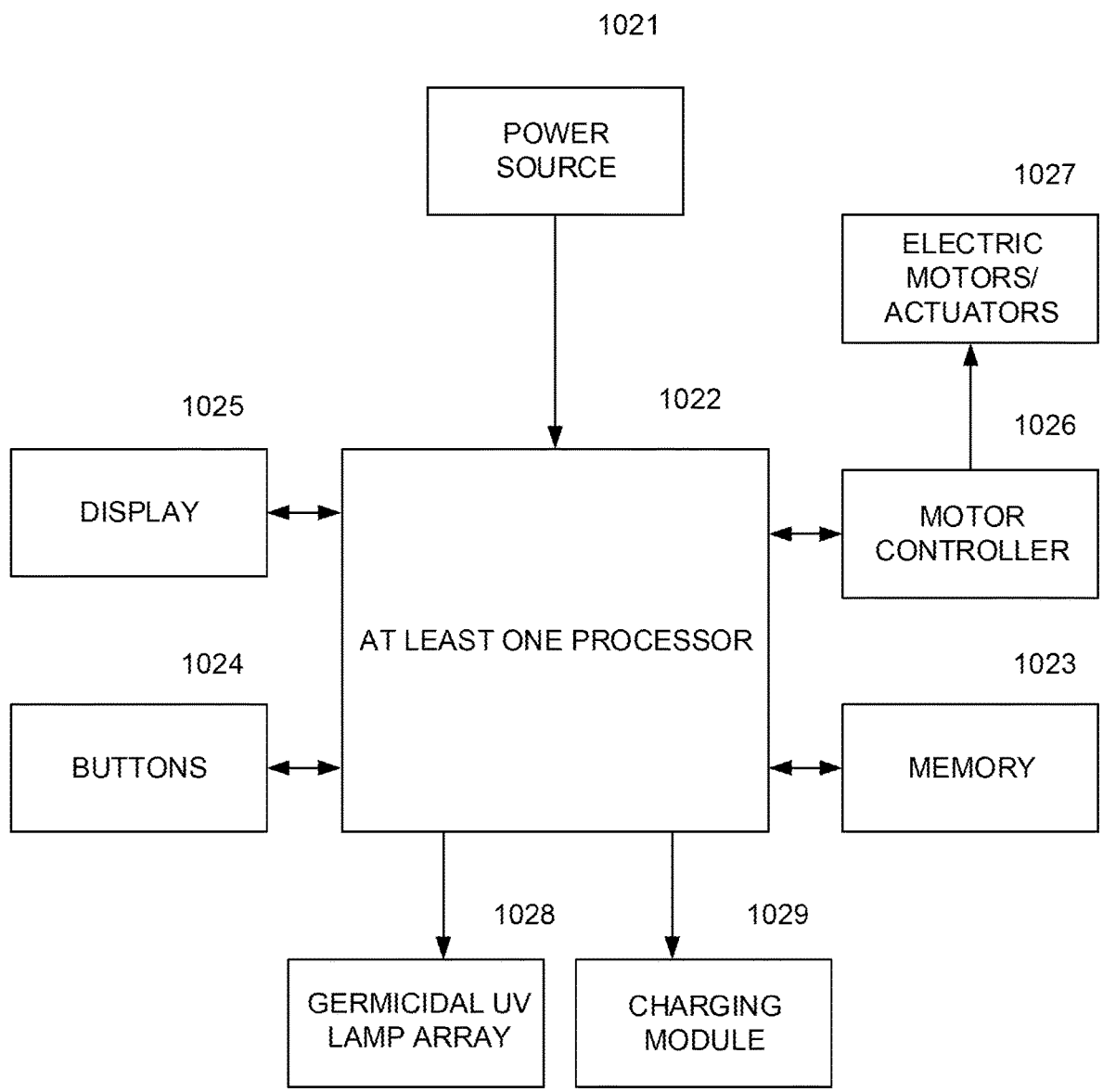
FIG. 9 illustrates a general microcontroller system that, when appropriately configured or designed, can serve as a microcontroller system in which the invention may be embodied.

FIG. 9 illustrates a block diagram of a typical computer or microcontroller system that, when appropriately configured, programmed or designed, can serve as a microcontroller system in which the invention may be embodied. The microcontroller system includes a power source 1021, at least one processor 1022 (also referred to as central processing units, or CPUs) that are coupled to memory storage devices 1023 including primary storage (typically a read only memory, or ROM) and/or secondary storage. The at least one processor 1022 may be of various types including microcontrollers and microprocessors such as, but not limited to, programmable devices (e.g., CPLDs and FPGAs) and unprogrammable devices such as gate array application specific integrated circuits (ASIC) or general-purpose microprocessors. As is well known and understood in the art, memory storage 1023 acts to transfer data and instructions bi- or uni-directionally to the processor. Memory storage 1023 is used typically to transfer data and instructions in a bi-directional manner though. Memory storage devices may include any suitable computer-readable media such as those described above.

In one embodiment of the invention, the at least one processor 1022 may be coupled with a plurality of buttons 1024 which may serve as input/output devices. The at least one processor 1022 may also be coupled to a display 1025 which may also serve as one or more input/output devices. Persons skilled in the art will readily appreciate such devices as, but not limited to, a liquid crystal display (LCD) unit or a light emitting diode (LED) unit. The at least one processor may be coupled with a motor controller 1026 which governs the speed and torque of the electric motors and/or actuators 1027 used in the present invention. The processor 1022 may also be coupled to an array of one or more germicidal UV lamps 1028 using suitable technologies. The processor may be used to govern UV lamp properties such as, but not limited to, the use of differing wavelengths and irradiation durations by the germicidal lamp array. Furthermore, the processor may be configured to a wireless induction charging unit or module 1029 such as, but not limited to, a wireless induction charging unit. Persons having skill in the art will readily appreciate that numerous implementations of the aforementioned configuration may be used to employ such a microcontroller means. Furthermore, persons skilled in the art will readily appreciate that the present invention may be implemented with a network in the course of performing the method steps described in the teachings of the present invention. In one embodiment of the invention, the microcontroller means is located in the electronic display, but such microcontroller means may be located in other locations as understood by persons having skill in the art.

Figure 10A:
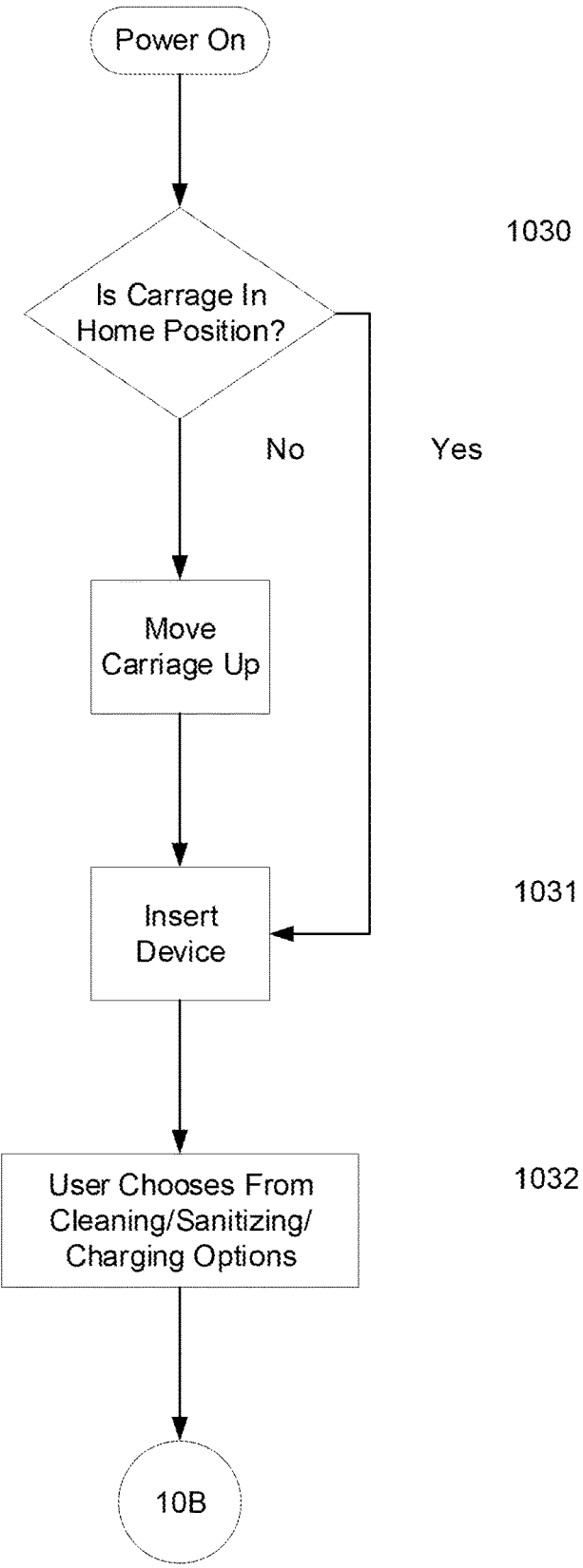
FIG. 10A illustrates a flowchart diagram of the steps for powering up, inserting a portable electronic device, and choosing from different options in an exemplary cleaning and sanitizing apparatus for handheld devices in accordance with an embodiment of the invention.

FIG. 10A illustrates a flowchart diagram of the steps for powering up, inserting a portable electronic device, and choosing from different options in an exemplary cleaning and sanitizing apparatus for handheld devices in accordance with an embodiment of the invention. When the power is turned on, the gripping and carriage means is moved to its home position 1030 to receive a handheld device. A user then places a handheld device into slot at the top of the unit 1031. The user may choose from a number of cleaning and sanitizing options by pressing one of a series of buttons 1032 on the top of the unit. Each button may correspond with a different mode of cleaning and sanitizing and may include additional features such as wireless charging.

Figure 10B:
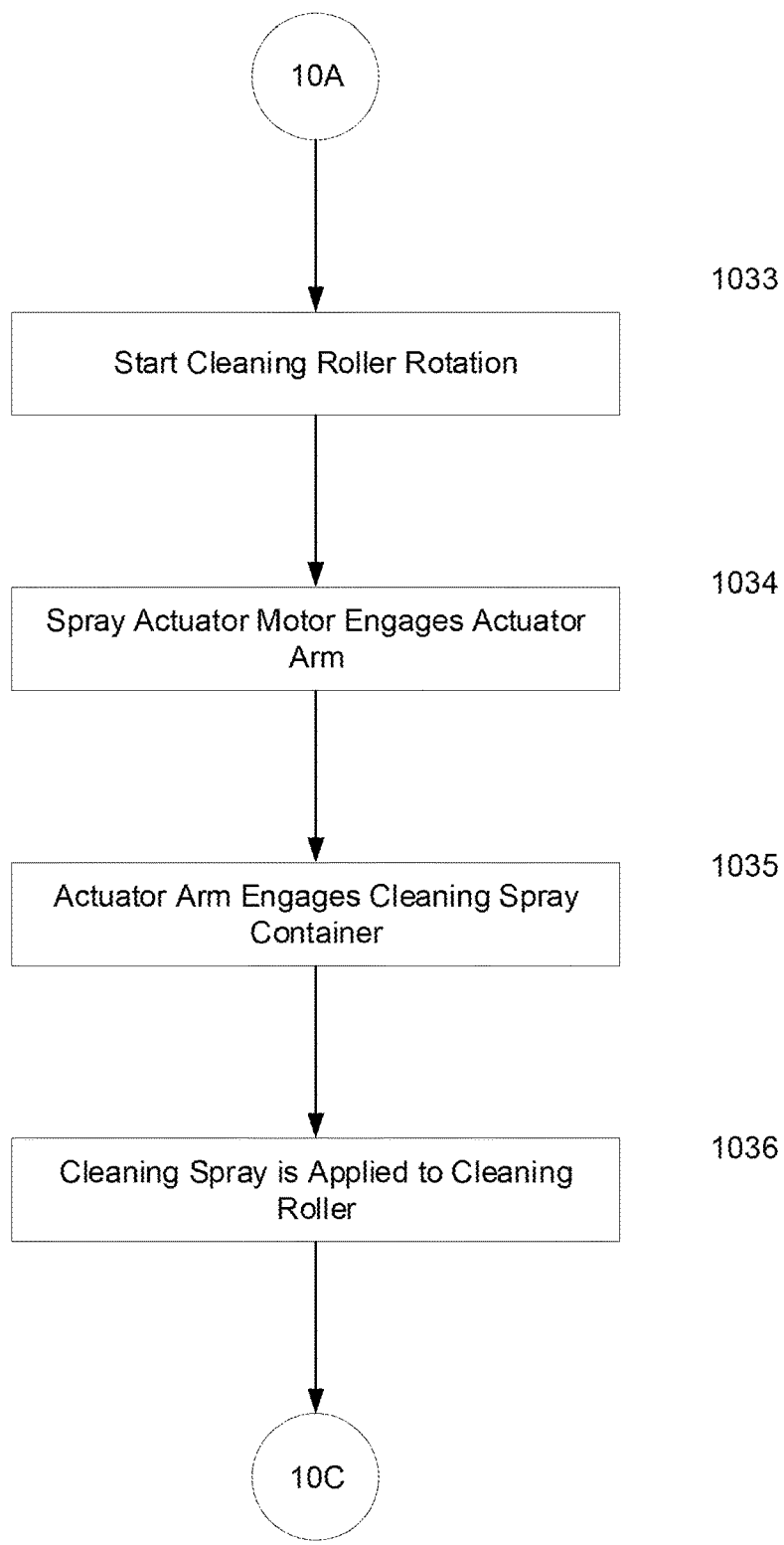
FIG. 10B illustrates a flowchart diagram of the steps for engaging the cleaning roller assembly of an exemplary cleaning and sanitizing apparatus for handheld devices in accordance with an embodiment of the invention.

FIG. 10B illustrates a flowchart diagram of the steps for engaging the cleaning roller assembly of an exemplary cleaning and sanitizing apparatus for handheld devices in accordance with an embodiment of the invention. Once the handheld device is inserted and a cleaning and sanitizing option is chosen, the cleaning roller assembly begins to function. First, a motor begins to rotate the cleaning roller 1033. An actuator motor then engages the actuator arm 1034 which then engages the cleaning spray container 1035. Engagement of the cleaning spray container releases a measured amount of cleaning spray to the cleaning roller 1036 which may involve, but is in no way limited to, the application of pressure to the said cleaning spray container or involving the opening of a valve.

Figure 10C:
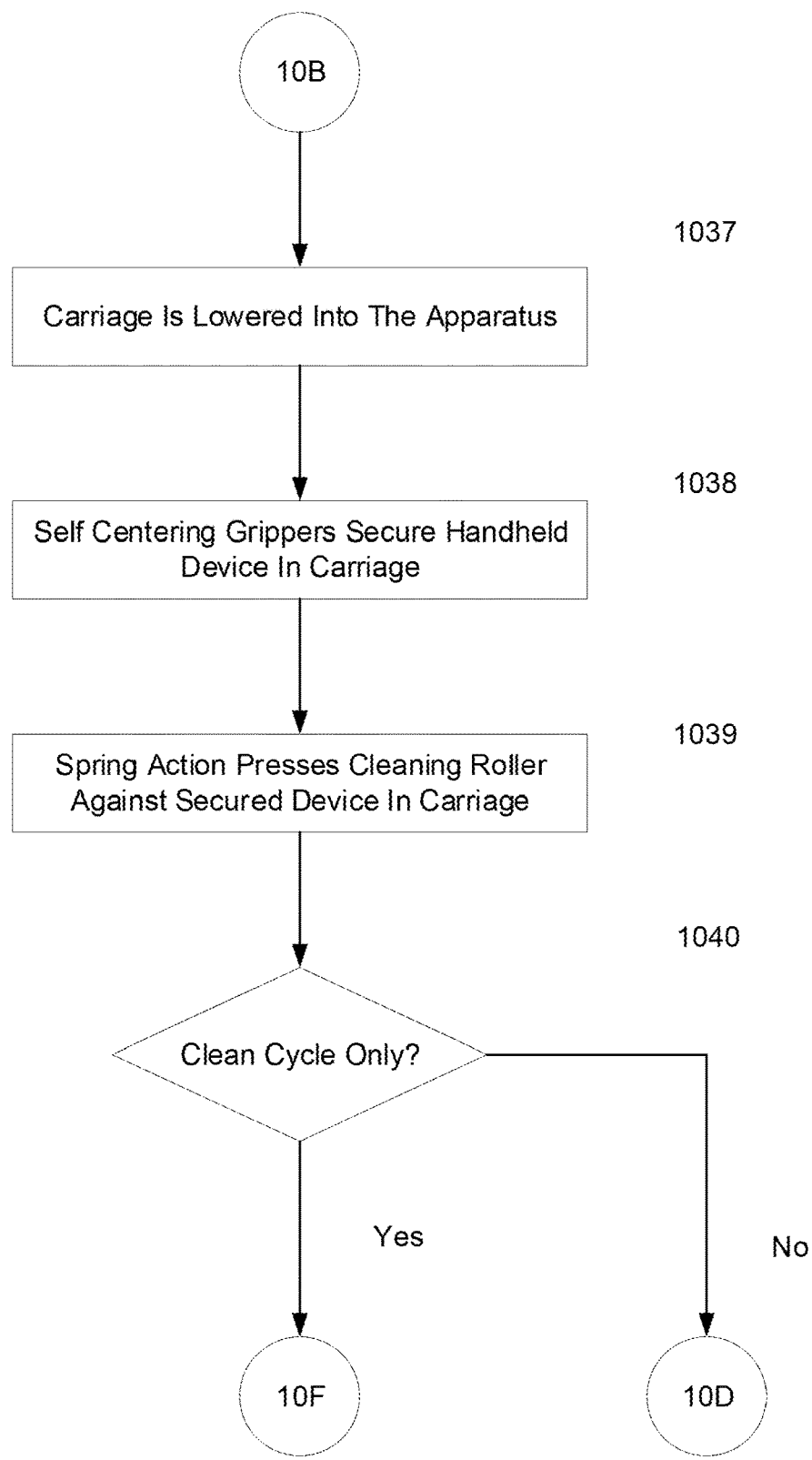
FIG. 10C illustrates a flowchart diagram of the steps for cleaning a handheld device with the cleaning roller assembly of an exemplary cleaning and sanitizing apparatus for handheld devices in accordance with an embodiment of the invention.

FIG. 10C illustrates a flowchart diagram of the steps for cleaning a handheld device with the cleaning roller assembly of an exemplary cleaning and sanitizing apparatus for handheld devices in accordance with an embodiment of the invention. After engaging the cleaning roller assembly, the carriage is then brought into the cleaning and sanitizing apparatus 1037. While being brought into the cleaning and sanitizing apparatus, the handheld device is secured by self-centering grippers 1038 which grasp the handheld device by its edges. A spring action then presses the cleaning roller, which is rotating with cleaning solution applied to it, against the front surface of the handheld device 1039. The next phase of the cleaning cycle is determined by the user's input 1040. If the user selected only the cleaning cycle, the device is then ejected from the cleaning and sanitizing apparatus as explained in FIG. 10F. If not, then the device enters the ultraviolet sanitizing phase as explained in FIG. 10D.

Figure 10D:
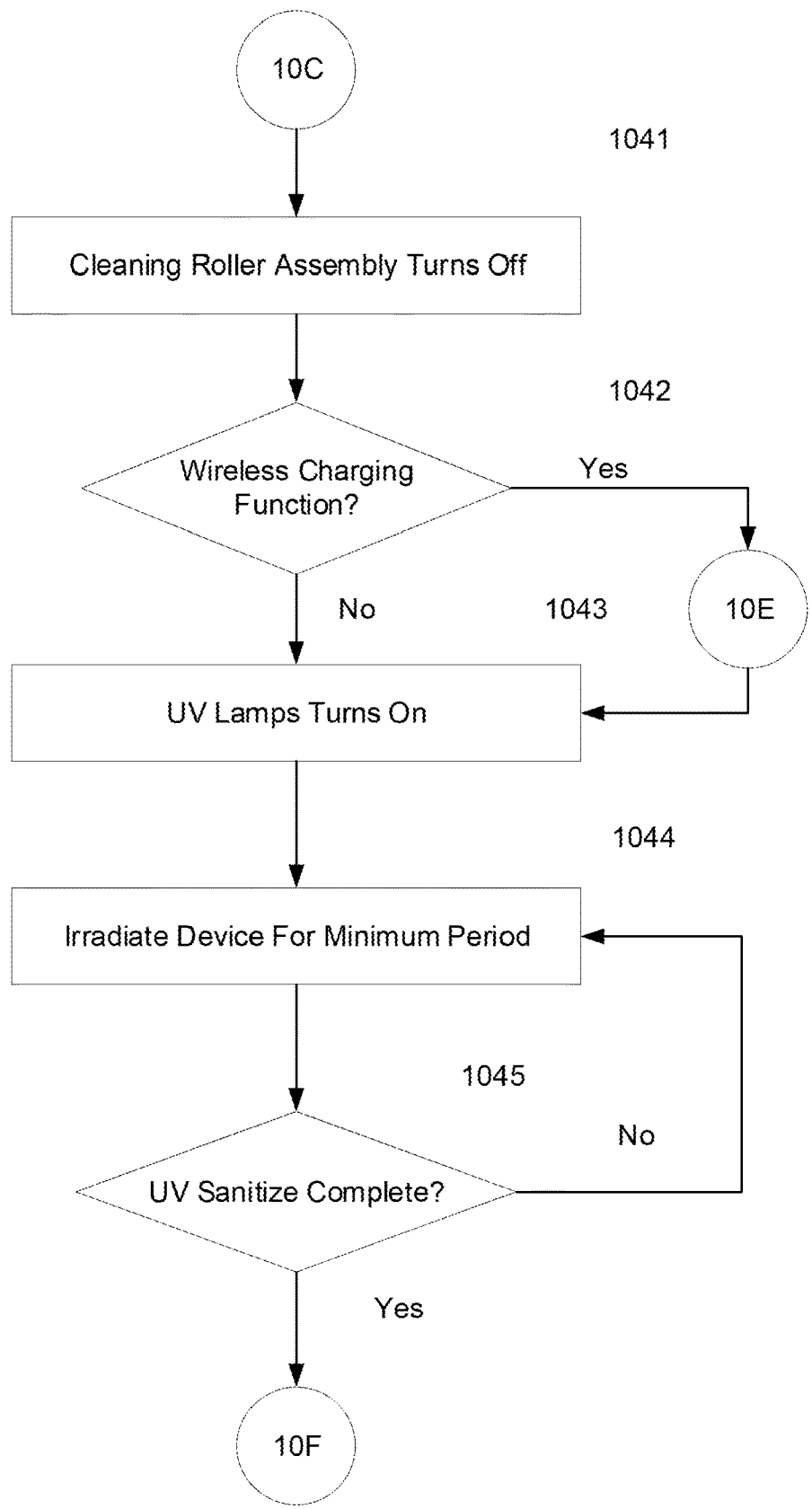
FIG. 10D illustrates a flowchart diagram of the steps for engaging the UV sanitizing lamp component of an exemplary cleaning and sanitizing apparatus for handheld devices in accordance with an embodiment of the invention.

FIG. 10D illustrates a flowchart diagram of the steps for engaging the UV sanitizing lamp component of an exemplary cleaning and sanitizing apparatus for handheld devices in accordance with an embodiment of the invention. After cleaning the handheld device with the cleaning roller assembly is finished, and the handheld device reaches the innermost point inside the apparatus, the cleaning roller assembly switches off 1041. At this point, the ultraviolet sanitizing lamps turn on 1042 to perform ultraviolet germicidal irradiation on the handheld device. If the user chooses the wireless charging function 1043, the wireless induction charging component contemporaneously turns on and begins charging the handheld device as is explained in FIG. 10E. The germicidal ultraviolet sanitizing lamps remain on for a minimum period 1044 to disinfect the surface of the handheld device. If the user chooses a longer sanitizing period, the germicidal ultraviolet sanitizing lamps may be programmed to remain on for the desired sanitizing period. In the preferred embodiment of the invention, the desired sanitizing period is one hour. When the ultraviolet sanitizing period is complete 1045, the sanitized and/or charged handheld device may be then ejected from the exemplary cleaning and sanitizing apparatus as described in FIG. 10F.

Figure 10E:
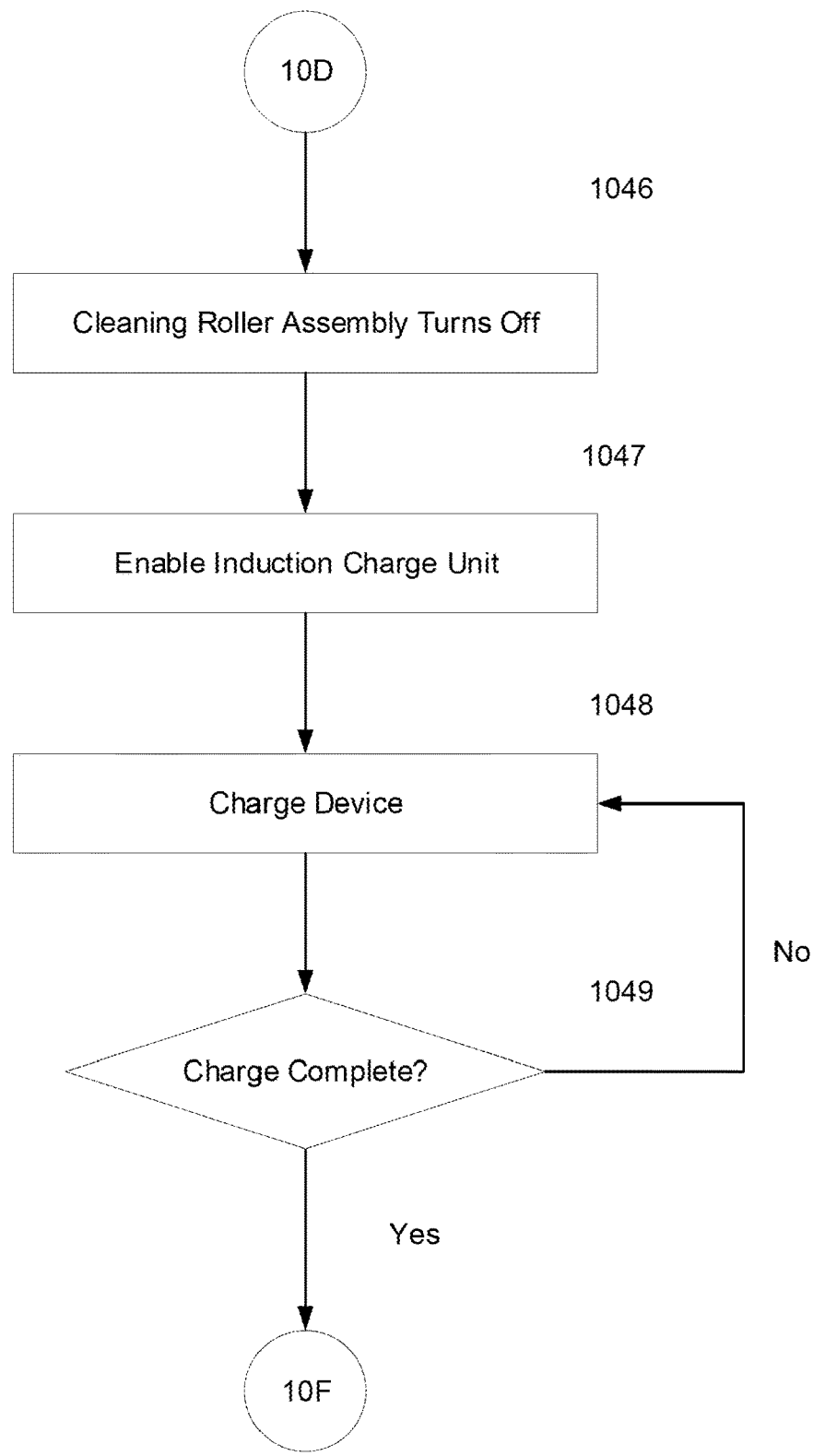
FIG. 10E illustrates a flowchart diagram of the steps for engaging the wireless charging component of an exemplary cleaning and sanitizing apparatus for handheld devices in accordance with an embodiment of the invention.

FIG. 10E illustrates a flowchart diagram of the steps for engaging the wireless charging component of an exemplary cleaning and sanitizing apparatus for handheld devices in accordance with an embodiment of the invention. After cleaning the handheld device with the cleaning roller assembly is finished, and the handheld device reaches the innermost point inside the apparatus, the cleaning roller assembly switches off 1046. Concurrently, the ultraviolet sanitizing lamps turn on 1042. If the user chooses the wireless charging function, the wireless induction charging component is then switched on 1047. The handheld device is then charged 1048. A timing mechanism then charges the handheld device for a fixed amount of time. When the charge is completed 1049, the handheld device may be ejected from the exemplary cleaning and sanitizing apparatus as described in FIG. 10F.

Figure 10F:
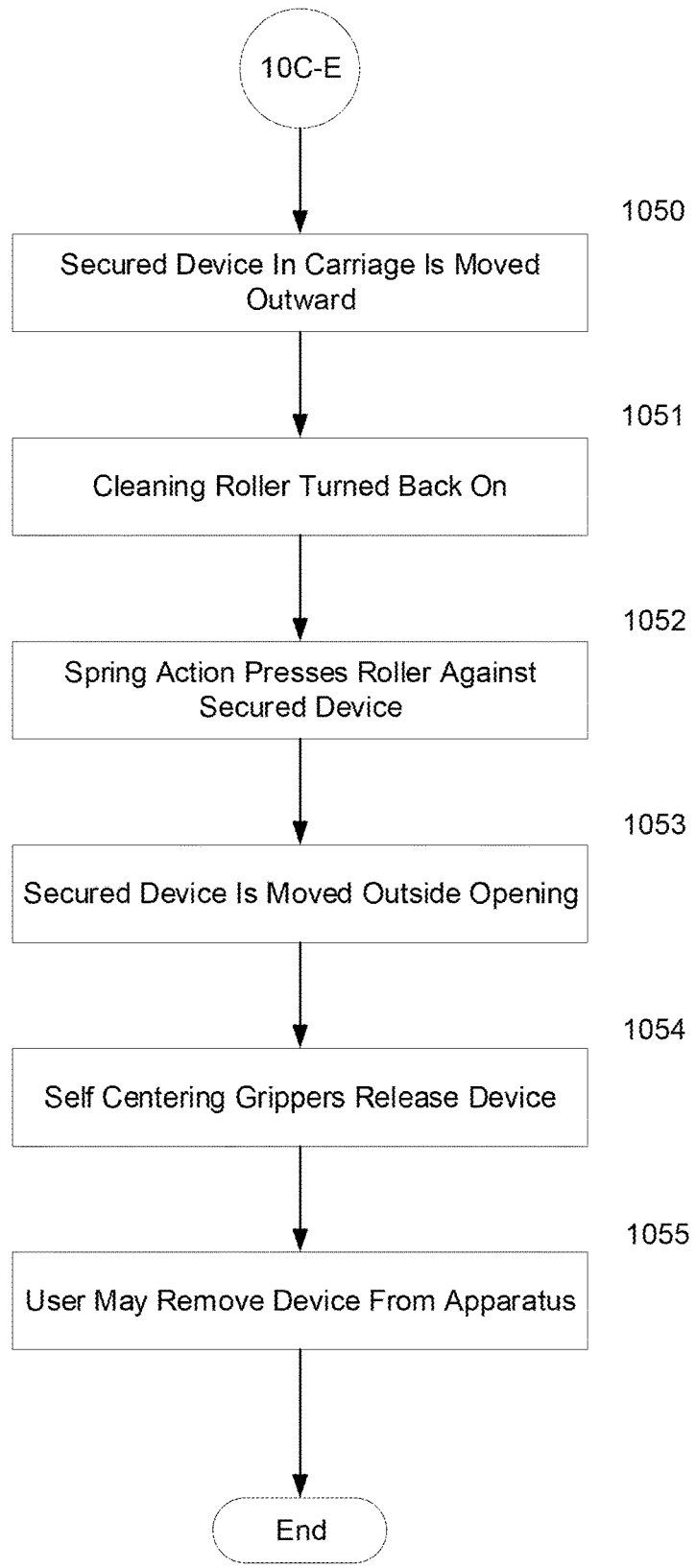
FIG. 10F illustrates a flowchart diagram of the steps for ejecting a handheld device from of an exemplary cleaning and sanitizing apparatus for handheld devices in accordance with an embodiment of the invention.

FIG. 10F illustrates a flowchart diagram of the steps for ejecting a handheld device from of an exemplary cleaning and sanitizing apparatus for handheld devices in accordance with an embodiment of the invention. After all cleaning, sanitizing and charging options have been completed, the secured handheld device is then moved outward by the carriage assembly 1050. The cleaning roller assembly is then re-engaged 1051 as described in FIG. 10B. As the secured device moves outward, a spring action presses the cleaning roller against the front surface of the handheld device 1052. One end of the secured handheld device is then moved outside the opening 1053. The self-centering grippers then release the handheld device 1054 and the user may then remove the cleaned and/or sanitized and/or charged device from the apparatus 1055.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Having fully described at least one embodiment of the cleaning and sanitizing apparatus for handheld devices, other equivalent or alternative methods of implementing the cleaning and sanitizing apparatus for handheld devices according to the present invention will be apparent to those skilled in the art. Various aspects of the invention have been described above by way of illustration, and the specific embodiments disclosed are not intended to limit the invention to the particular forms disclosed. The particular implementation of the cleaning and sanitizing apparatus for handheld devices may vary depending upon the particular context or application. By way of example, and not limitation, cleaning and sanitizing apparatus for handheld devices described in the foregoing was principally directed to the cleaning and sanitizing of handheld devices such as smartphones. However, similar techniques may instead be applied to other handheld devices which implementations of the present invention are contemplated as within the scope of the present invention. Such possibilities include, but are not limited to, the cleaning and sanitization of tablets, laptop computers and other handheld devices. Further alternative embodiments of the present invention may include different types of device insertion locations and appearances such as, but not limited to, side inserting or a hinged door. Alternative embodiments may also employ the use of multiple roller assemblies for cleaning both surfaces of a handheld device. The invention is thus to cover all modifications, equivalents, and alternatives falling within the spirit and scope of the following claims. It is to be further understood that not all of the disclosed embodiments in the foregoing specification will necessarily satisfy or achieve each of the objects, advantages, or improvements described in the foregoing specification.

Although specific features of the cleaning and sanitizing apparatus for handheld devices are shown in some drawings and not others, persons skilled in the art will understand that this is for convenience. Each feature may be combined with any or all of the other features in accordance with the invention. The words "including," "comprising," "having," and "with" as used herein are to be interpreted broadly and comprehensively and are not limited to any physical interconnection. Claim elements and steps herein may have been numbered and/or lettered solely as an aid in readability and understanding. Any such numbering and lettering in itself is not intended to and should not be taken to indicate the ordering of elements and/or steps in the claims to be added at a later date.

Any amendment presented during the prosecution of the application for this patent is not a disclaimer of any claim element presented in the description or claims to be filed. Persons skilled in the art cannot reasonably be expected to draft a claim that would literally encompass each and every equivalent.

What is claimed is:

1. A cleaning and sanitizing apparatus for handheld devices comprising:
    a cuboid-shaped unit body having a top end and a base end;
    a slot opening located on the top end of the said cuboid-shaped unit body configured to accept handheld devices;
    a user interface;
    a microcontroller;
    a gripping and carriage apparatus for securing, lowering and raising handheld devices into and from the said cuboid-shaped unit body;
    a removeable cleaning solution reservoir;
    an access door for access to, and for protecting, the said removeable cleaning solution reservoir;
    a housing for accommodating the said removeable cleaning solution reservoir;
    a pump and sprayer apparatus for dispensing cleaning solution;
    a moveable cleaning roller apparatus for cleaning the surfaces of handheld devices as the said handheld devices are lowered into and raised from the said cuboid shaped unit body;
    and
    an irradiation chamber located at the base end of the said cuboid shaped unit body including a germicidal ultraviolet lamp array, said germicidal ultraviolet lamp array consisting of at least four ultraviolet lamps spaced apart in such a manner so as to surround a handheld device and provide germicidal UV radiation to both sides of a handheld device, and a plurality of mirrors, reflective surfaces, and lenses to reflect and redirect germicidal UV radiation to a greater surface area of a handheld device.

2. The cleaning and sanitizing apparatus for handheld devices as recited in claim 1 wherein the gripping and carriage apparatus for securing, lowering and raising handheld devices into and from said cuboid-shaped unit body consists of self-centering grippers attached to a threaded drive rod and a smooth drive rod.

3. The cleaning and sanitizing apparatus for handheld devices as recited in claim 1 wherein the gripping and carriage apparatus for securing, lowering and raising handheld devices into and from said cuboid-shaped unit body is driven by an electric motor.

4. The cleaning and sanitizing apparatus for handheld devices as recited in claim 1 wherein the moveable cleaning roller apparatus consists of a roller motor, an engagement means, and at least one interchangeable cleaning roller.

5. The cleaning and sanitizing apparatus for handheld devices as recited in in claim 4 wherein the interchangeable cleaning roller has an absorbent surface where cleaning solution is applied.

6. The cleaning and sanitizing apparatus for handheld devices as recited in claim 1 wherein the removeable cleaning solution reservoir is refillable.

7. The cleaning and sanitizing apparatus for handheld devices as recited in claim 1 further comprising a wireless inductive charging apparatus.

8. The cleaning and sanitizing apparatus for handheld devices as recited in claim 7 wherein the wireless inductive charging apparatus is positioned in the irradiation chamber in such a manner so as not to interfere with light propagated from the germicidal ultraviolet lamp array.

9. The cleaning and sanitizing apparatus for handheld devices as recited in claim 1 wherein lamps of the germicidal ultraviolet lamp array employ germicidal ultraviolet radiation of differing wavelengths.

10. A cleaning and sanitizing apparatus for handheld devices comprising:
a cuboid-shaped unit body having a top end and a base end;
a slot opening located on the top end of the said cuboid-shaped unit body configured to accept handheld devices;
a gripping and carriage apparatus for securing, lowering and raising handheld devices into and from said cuboid shaped unit body;
a removeable cleaning solution reservoir;
an access door for access to, and for protecting, the said removeable cleaning solution reservoir;
a housing for accommodating the said removeable cleaning solution reservoir;
a pump and sprayer apparatus for dispensing cleaning solution;
a moveable cleaning roller apparatus for cleaning the surfaces of handheld devices, said moveable cleaning roller apparatus for cleaning the surfaces of a handheld devices consisting of a roller motor, an engagement means, and at least one interchangeable cleaning roller configured to frictionally engage the surface of a handheld device as the said handheld devices is lowered into and raised from the said cuboid shaped unit body;
an irradiation chamber located at the base end of the interior of the said cuboid shaped unit body including a germicidal ultraviolet lamp array, said germicidal ultraviolet lamp array in the irradiation chamber including at least four ultraviolet lamps spaced apart in such a manner so as to surround a handheld device and provide optimal germicidal UV radiation to the surface area of a handheld device, and a plurality of mirrors, reflective surfaces, and lenses to reflect and redirect germicidal UV radiation to a greater surface area of a handheld device;
a wireless inductive charging apparatus, said wireless inductive charging apparatus positioned in the irradiation chamber in such a manner so as not to interfere with light propagated from the germicidal ultraviolet lamp array;
a user interface;
at least one processor; and
memory comprising computer-executable instructions when executed by the at least one processor, cause the cleaning and sanitizing apparatus for handheld apparatus by at least one processor to perform the steps of
  a. moving the said gripping and carriage apparatus for securing, lowering and raising handheld devices into and from the said cuboid shaped unit body into its home position to receive a handheld device;
  b. securing an inserted handheld device with the said gripping and carriage apparatus for securing, lowering and raising handheld devices into and from the said cuboid shaped unit body;
  c. activating the moveable cleaning roller apparatus;
  d. applying a measured amount of cleaning solution to the cleaning roller of the said moveable cleaning roller apparatus using said the pump and sprayer apparatus for dispensing cleaning solution;
  e. cleaning a handheld device by engaging the said moveable cleaning roller of the said moveable cleaning roller apparatus for cleaning the surfaces of handheld devices with a secured handheld device as the said secured handheld device is lowered into the said cuboid shaped unit body;
  f. switching off the said moveable cleaning roller apparatus when the secured handheld device enters the irradiation chamber located at the base end of the said cuboid shaped unit body;
  g. sanitizing the secured handheld device with the said at least four germicidal ultraviolet lamps of the germicidal ultraviolet lamp array;
  h. charging a handheld device with the said wireless inductive charging apparatus; and
  i. ejecting the handheld device from the said cleaning and sanitizing apparatus for handheld devices.

11. The cleaning and sanitizing apparatus for handheld devices as recited in claim 10 wherein the gripping and carriage apparatus for securing, lowering and raising handheld devices into and from said cuboid-shaped unit body consists of self-centering grippers attached to a threaded drive rod and a smooth drive rod.

12. The cleaning and sanitizing apparatus for handheld devices as recited in claim 10 wherein the gripping and carriage apparatus for securing, lowering and raising handheld devices into and from said cuboid-shaped unit body is driven by an electric motor.

13. The cleaning and sanitizing apparatus for handheld devices as recited in claim 10 wherein the interchangeable cleaning roller has an absorbent surface where cleaning solution is applied.

14. The cleaning and sanitizing apparatus for handheld devices as recited in claim 10 wherein the removeable cleaning solution reservoir is a refillable reservoir.

15. The cleaning and sanitizing apparatus for handheld devices as recited in claim 10 wherein lamps of the germicidal lamp array employ germicidal ultraviolet radiation of differing wavelengths.

* * * * *